US012555923B2

(12) United States Patent
Jin et al.

(10) Patent No.: US 12,555,923 B2
(45) Date of Patent: Feb. 17, 2026

(54) TRANSPARENT OSCILLATOR UNIT, TRANSPARENT ANTENNA AND ANTENNA SYSTEM

(71) Applicants: Beijing BOE Sensor Technology Co., Ltd., Beijing (CN); BOE TECHNOLOGY GROUP CO., LTD., Beijing (CN)

(72) Inventors: Yunnan Jin, Beijing (CN); Zhifeng Zhang, Beijing (CN)

(73) Assignees: Beijing BOE Sensor Technology Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 261 days.

(21) Appl. No.: 18/274,983

(22) PCT Filed: Dec. 31, 2021

(86) PCT No.: PCT/CN2021/143478
§ 371 (c)(1),
(2) Date: Jul. 28, 2023

(87) PCT Pub. No.: WO2023/123298
PCT Pub. Date: Jul. 6, 2023

(65) Prior Publication Data
US 2024/0154319 A1 May 9, 2024

(51) Int. Cl.
*H01Q 1/38* (2006.01)
*H01Q 1/50* (2006.01)
*H01Q 21/00* (2006.01)

(52) U.S. Cl.
CPC ........... *H01Q 21/0006* (2013.01); *H01Q 1/38* (2013.01); *H01Q 1/50* (2013.01)

(58) Field of Classification Search
None
See application file for complete search history.

(56) References Cited

U.S. PATENT DOCUMENTS

2022/0328955 A1* 10/2022 Park .......................... H01Q 1/38
2024/0195069 A1* 6/2024 Zhang .................. H01Q 21/065

FOREIGN PATENT DOCUMENTS

CN 103066381 A * 4/2013
CN 105870619 A 8/2016
(Continued)

*Primary Examiner* — Dameon E Levi
*Assistant Examiner* — Anh N Ho
(74) *Attorney, Agent, or Firm* — HOUTTEMAN LAW LLC

(57) ABSTRACT

The present disclosure provides a transparent oscillator unit, a transparent antenna and an antenna system, and belongs to the field of communication technology. The transparent oscillator unit of the present disclosure includes: a first bearing structure including a first surface and a second surface opposite to each other; a radiation assembly on the first surface of the first bearing structure; a feed structure on the second surface of the first bearing structure; a second bearing structure on a side of the feed structure away from the radiation assembly, and fixed to the first bearing structure; and a reference electrode layer on the second bearing structure; wherein orthographic projections of any two of the radiation assembly, the feed structure and the reference electrode layer on the second bearing structure at least partially overlap with each other.

16 Claims, 8 Drawing Sheets

(56) References Cited

FOREIGN PATENT DOCUMENTS

| | | | | | |
|---|---|---|---|---|---|
| CN | 106374290 | A | | 2/2017 | |
| CN | 107834198 | A | * | 3/2018 | ............... H01Q 1/52 |
| CN | 109950691 | A | | 6/2019 | |
| CN | 110021462 | A | | 7/2019 | |
| CN | 110466323 | A | | 11/2019 | |
| CN | 111063997 | A | | 4/2020 | |
| CN | 111129737 | A | | 5/2020 | |
| CN | 211126057 | U | | 7/2020 | |
| CN | 112072301 | A | * | 12/2020 | ............... H01Q 1/50 |
| CN | 112201917 | A | | 1/2021 | |
| CN | 212277392 | U | | 1/2021 | |
| CN | 212695310 | U | * | 3/2021 | |
| CN | 112787081 | A | * | 5/2021 | ............... H01Q 1/38 |
| CN | 112866513 | A | | 5/2021 | |
| CN | 113097717 | A | * | 7/2021 | ........... H01Q 19/104 |
| CN | 113140912 | A | | 7/2021 | |
| EP | 4087057 | A1 | | 11/2022 | |
| WO | 2019163024 | A1 | | 8/2019 | |

* cited by examiner

TRANSPARENT OSCILLATOR UNIT, TRANSPARENT ANTENNA AND ANTENNA SYSTEM

TECHNICAL FIELD

The present disclosure relates to the field of communication technology, and in particular to a transparent oscillator unit, a transparent antenna and an antenna system.

BACKGROUND

The massive MIMO antenna technology is one of the key technologies for 5G, and compared with an antenna arrangement of 4T4R or 8T8R in the 4G era, the massive MIMO mainly adopts an antenna arrangement of 32T32R or 64T64R. Obviously, the demand for antennas has multiplied.

At present, a solution for the massive MIMO antenna mainly includes a PCB oscillator solution, a sheet metal stamping oscillator solution and a plastic oscillator solution. The PCB oscillator solution and the sheet metal stamping oscillator solution are all accomplished through welding weld legs of an oscillator and pads of a high frequency board in a one-to-one correspondence, which deteriorates the uniformity of an antenna. In order to improve the uniformity of the massive MIMO antenna, the plastic oscillator solution is emerged. In the plastic oscillator solution, the whole antenna is formed through an integrated injection molding process, a laser etching process, a chemical plating process or an electroplating process and the like. Although the plastic oscillator solution can improve the uniformity of the antenna, the plastic oscillator solution is not dominant in processing large-area laser etching patterns with the increasingly low-cost antenna requirement. Therefore, it is imperative to provide a massive MIMO antenna solution, which can reduce the machining pressure and the machining cost.

SUMMARY

The present disclosure aims to solve at least one technical problem in the prior art and provides a transparent oscillator unit, a transparent antenna and an antenna system.

The technical solution adopted for solving the technical problems of the present disclosure is a transparent oscillator unit, including: a first bearing structure including a first surface and a second surface opposite to each other; a radiation assembly on the first surface of the first bearing structure; a feed structure on the second surface of the first bearing structure; a second bearing structure on a side of the feed structure away from the radiation assembly, and fixed to the first bearing structure; and a reference electrode layer on the second bearing structure; wherein orthographic projections of any two of the radiation assembly, the feed structure and the reference electrode layer on the second bearing structure at least partially overlap with each other.

In some examples, the first bearing structure includes: a bearing substrate including a third surface and a fourth surface opposite to each other; and a bearing boss on the bearing substrate and on the third surface of the bearing substrate; wherein the bearing boss includes a fifth surface and a sixth surface opposite to each other, and the fifth surface and the third surface are connected together to form the first surface; the sixth surface and the fourth surface are connected together to form the second surface; and the radiation assembly is on the fifth surface, and the feed structure is on the fourth surface and the sixth surface.

In some examples, the bearing boss includes a concave part, and the bearing substrate includes a first opening corresponding to the concave part; the fifth surface includes a first sub-surface, and a first connection side surface connecting the third surface and the first sub-surface; the sixth surface includes a second sub-surface, and a second connection side surface connecting the fourth surface and the second sub-surface; and the radiation assembly is on the first sub-surface; the feed structure extends from the fourth surface to the second sub-surface through the second connection side surface.

In some examples, the second sub-surface includes a first portion and a second portion; a part of the feed structure is on the first portion, and a distance between the first portion and the second bearing structure is no greater than a distance between the second portion and the second bearing structure.

In some examples, the first bearing structure further includes: a first side plate and a second side plate, and the bearing substrate includes a first side surface and a second side surface extending along a first direction and opposite to each other in a second direction, the first side plate is connected to the first side surface, the second side plate is connected to the second side surface, and both the first side plate and the second side plate protrude from the fifth surface and the sixth surface; and the transparent oscillator unit further includes a first isolation layer on a surface of the first side plate away from the first side surface, and a second isolation layer on a surface of the second side plate away from the second side surface.

In some examples, at least one of the first isolation layer and the second isolation layer includes a second opening.

In some examples, a length of the second opening in the first direction is a half wavelength.

In some examples, the first isolation layer includes a first substrate and a first conductive layer which are stacked together; the first substrate is fixed to the first side plate; and the second isolation layer includes a second substrate and a second conductive layer which are stacked together; the second substrate is fixed to the second side plate.

In some examples, each of the first conductive layer and the second conductive layer includes a metal mesh structure.

In some examples, the first side plate, the second side plate, the bearing substrate and the bearing boss have a one-piece structure.

In some examples, the feed structure includes a first feed structure and a second feed structure; portions of orthographic projections of the first feed structure and the second feed structure on the second bearing structure overlapping with an orthographic projection of the radiation assembly on the second bearing structure are a first line segment and a second line segment, respectively; extending directions of the first line segment and the second line segment both pass through a center of the orthographic projection of the radiation assembly on the second bearing structure, and intersect with each other.

In some examples, a shape of the radiation assembly is a central-symmetric pattern.

In some examples, the radiation assembly satisfies at least one of the following conditions: the radiation assembly includes a central hole; the radiation assembly includes a notch on a side of the radiation assembly and concaved towards the center of the radiation assembly; each corner of the radiation assembly is a flat chamfer; and each corner of the radiation assembly includes a protrusion.

In some examples, the radiation assembly is adhered to the first surface of the first bearing structure by an adhesive layer.

In some examples, the radiation assembly includes a third substrate and a third conductive layer which are stacked together; the third substrate is fixed to the first surface of the first bearing structure.

In some examples, the third conductive layer includes a metal mesh structure.

In some examples, the metal mesh structure has a line width in a range from 2 μm to 30 μm; a line spacing in a range from 50 μm to 250 μm; and a line thickness in a range from 1 μm to 10 μm.

In a second aspect, an embodiment of the present disclosure provides a transparent antenna, which includes the transparent oscillator unit of any one of the above examples.

In some examples, the transparent antenna includes a plurality of sub-arrays, wherein each sub-array includes a plurality of transparent oscillator units arranged side by side along the first direction, and the feed structure is shared among the transparent oscillator units in each sub-array.

In some examples, the feed structure includes a first feed port, a plurality of second feed ports and a plurality of transmission lines, the plurality of second feed ports are in one-to-one correspondence with the radiation assemblies of the transparent oscillator units in the sub-array; one transmission line is connected between the first feed port and one corresponding second feed port; and line lengths of the transmission lines connected to the second feed ports corresponding to the radiation assemblies of the transparent oscillator units in the sub-array monotonically increases or decreases along the first direction.

In some examples, an operating frequency of the transparent antenna is in a range of 3400 MHz to 3600 MHz.

In a third aspect, an embodiment of the present disclosure provides an antenna system, which includes the transparent antenna of any one of the above examples.

DETAIL DESCRIPTION OF EMBODIMENTS

In order to enable one of ordinary skill in the art to better understand the technical solutions of the present disclosure, the present disclosure will be described in further detail with reference to the accompanying drawings and the detailed description.

Unless defined otherwise, technical or scientific terms used herein shall have the ordinary meaning as understood by one of ordinary skill in the art to which the present disclosure belongs. The terms "first", "second", and the like used in the present disclosure are not intended to indicate any order, quantity, or importance, but rather are used for distinguishing one element from another. Further, the term "a", "an", "the", or the like used herein does not denote a limitation of quantity, but rather denotes the presence of at least one element. The term of "comprising", "including", or the like, means that the element or item preceding the term contains the element or item listed after the term and its equivalent, but does not exclude other elements or items. The term "connected", "coupled", or the like is not limited to physical or mechanical connections, but may include electrical connections, whether direct or indirect connections. The terms "upper", "lower", "left", "right", and the like are used only for indicating relative positional relationships, and when the absolute position of an object being described is changed, the relative positional relationships may also be changed accordingly.

Figure 1:
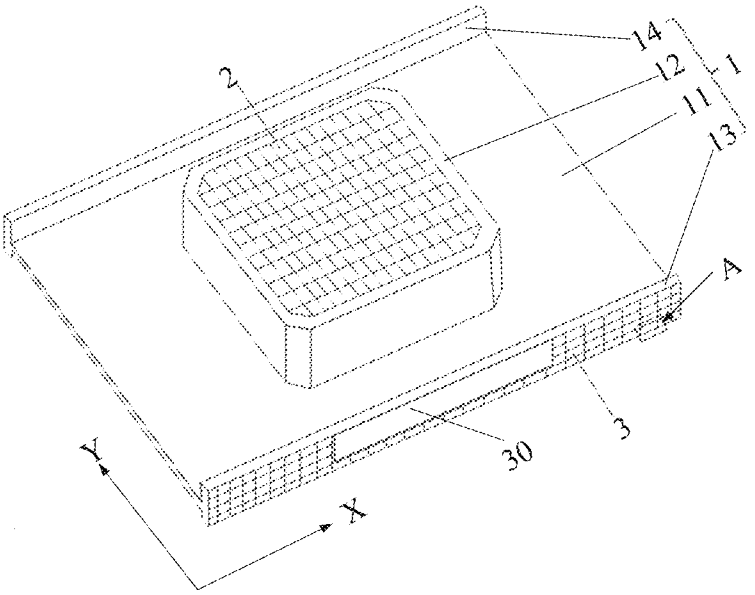
FIG. 1 is a front perspective view of a transparent oscillator unit according to an embodiment of the present disclosure.
Figure 2:
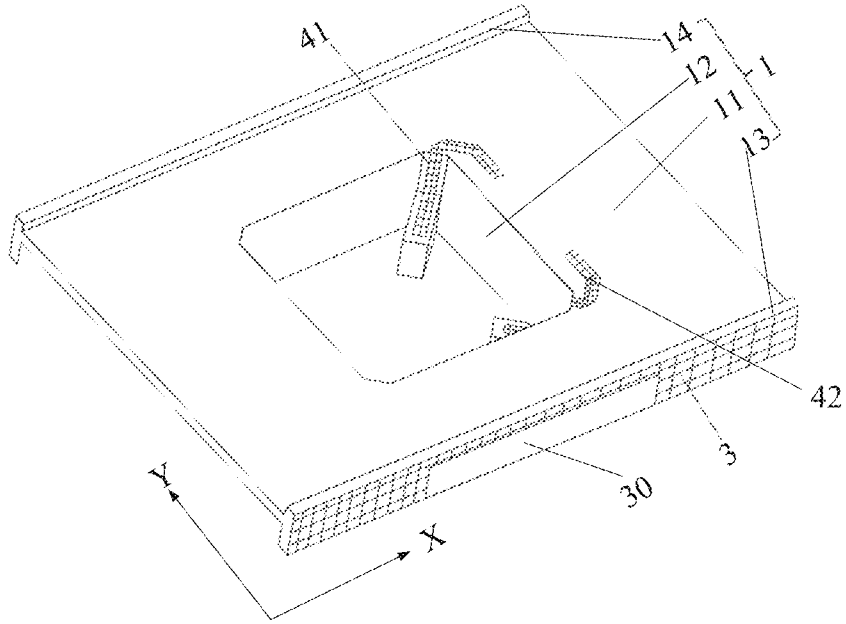
FIG. 2 is a back perspective view of a transparent oscillator unit according to an embodiment of the present disclosure.
Figure 3:
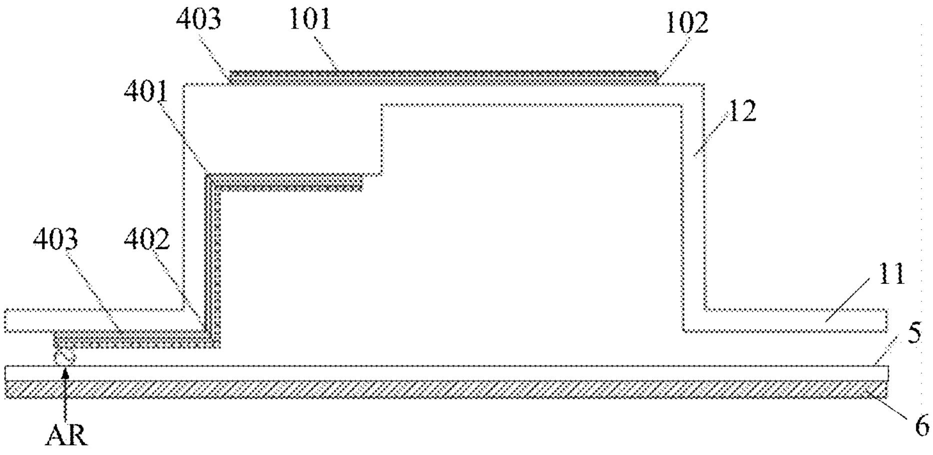
FIG. 3 is a partial cross-sectional view of a transparent oscillator unit according to an embodiment of the present disclosure.
Figure 4:
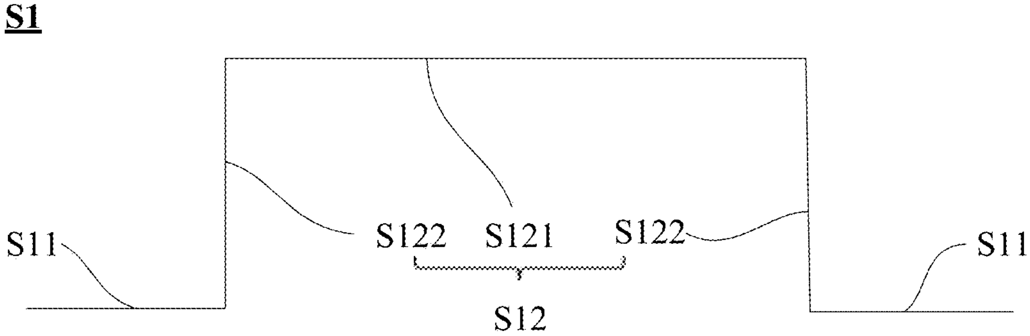
FIG. 4 is a cross-sectional view of a first surface of a first bearing structure of a transparent oscillator unit according to an embodiment of the present disclosure.
Figure 5:
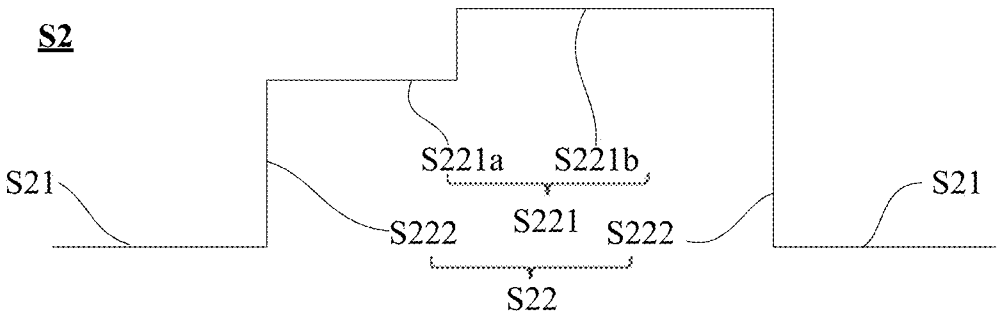
FIG. 5 is a cross-sectional view of a second surface of a first bearing structure of a transparent oscillator unit according to an embodiment of the present disclosure.

In a first aspect, an embodiment of the present disclosure provides a transparent oscillator unit, which is mainly applied in a massive MIMO antenna system. FIG. 1 is a front perspective view of a transparent oscillator unit according to an embodiment of the present disclosure. FIG. 2 is a back perspective view of a transparent oscillator unit according to an embodiment of the present disclosure. FIG. 3 is a partial cross-sectional view of a transparent oscillator unit according to an embodiment of the present disclosure. FIG. 4 is a cross-sectional view of a first surface S1 of a first bearing structure 1 of a transparent oscillator unit according to an embodiment of the present disclosure. FIG. 5 is a cross-sectional view of a second surface S2 of a first bearing structure 1 of a transparent oscillator unit according to an embodiment of the present disclosure. As shown in FIGS. 1 to 5, the transparent oscillator unit may include: a first bearing structure 1, a second bearing structure 5, a radiation assembly 2, a feed structure and a reference electrode layer 6. The first bearing structure 1 includes a first surface S1 and a second surface S2 opposite to each other. The radiation assembly is arranged on the first surface S1 of the first bearing structure 1 and the feed structure is arranged on the second surface S2 of the first bearing structure 1. The second bearing structure 5 is arranged on a side of the feed structure away from the radiation assembly 2 and is fixed to the first bearing structure 1 as shown by an arrow AR. The reference electrode layer 6 is arranged on the second bearing structure 5. Orthographic projections of any two of the radiation assembly 2, the feed structure and the reference electrode layer 6 on the second bearing structure 5 at least partially overlap with each other, so that a current loop is formed among the radiation assembly 2, the feed structure and the reference electrode layer 6, and a microwave signal fed by the feed structure may be coupled to the radiation assembly 2, to realize transmission of the microwave signal.

The radiation assembly 2 in the embodiment of the present disclosure may be a transparent conductive film manufactured in advance, for example, including a metal mesh structure, and then may be attached to the first surface S1 of the first bearing structure 1 through a film attaching process. With such the structure and the manufacturing method, it is easily machined and has a low cost.

In some examples, as shown with reference to FIGS. 1 to 3, the first bearing structure 1 may specifically include a bearing substrate 11 and a bearing boss 12 (a bearing bump) disposed on the bearing substrate 11. The bearing substrate 11 includes a third surface S11 and a fourth surface S21 opposite to each other; the bearing boss 12 includes a fifth surface S12 and a sixth surface S22 opposite to each other. The third surface S11 of the bearing substrate 11 and the fifth surface S12 of the bearing boss 12 are connected to each other, forming the first surface S1 of the first bearing structure 1, and the fourth surface S21 of the bearing substrate 11 and the sixth surface S22 of the bearing boss 12 are connected to each other, forming the second surface S2 of the first bearing structure 1. It will be understood that, the bearing boss 12, just as its name implies, is a convex structure. In the embodiment of the present disclosure, the bearing boss 12 protrudes in a direction away from the second surface S2 of the bearing substrate 11, and the fifth surface S12 of the bearing boss 12 is necessarily a convex surface. In this case, the radiation assembly 2 is arranged on the fifth surface S12 of the bearing boss 12, for example, on a portion of the fifth surface S12 parallel to the reference electrode layer 6. The feed structure is disposed on the fourth surface S21 and the sixth surface S22.

In one example, as shown with reference to FIGS. 1 to 5, the bearing boss 12 of the first bearing structure 1 includes a concave part, and correspondingly, the bearing substrate 11 includes a first opening corresponding to the concave part. Since the bearing boss 12 includes the concave part, the fifth surface S12 of the bearing boss 12 includes a first sub-surface S121 and a first connection side surface S122 connecting the third surface S11 and the first sub-surface S121, and the sixth surface S22 of the bearing boss 12 includes a second sub-surface S221 and a second connection side surface S222 connecting the fourth surface S21 and the second sub-surface S221. The radiation assembly 2 is arranged on the first sub-surface S121; the feed structure extends from the fourth surface S21 to the second sub-surface S221 through the second connection side surface S222. Because the bearing boss 12 of the first bearing structure 1 includes the concave part, the microwave loss when the microwave signal is coupled by the feed structure to the radiation assembly 2 can be reduced, and the transparent oscillator unit in the embodiment of the present disclosure can have a lighter structure.

Further, referring to FIG. 3, in order to satisfy a coupling distance between the feed structure and the radiation assembly 2, the second sub-surface S221 of the bearing boss 12 may be a step-shaped surface, that is, the second sub-surface S221 may include a first portion S221*a* (a first step-shaped surface) and a second portion S221*b* (a second step-shaped surface), and a distance from the first portion S221*a* to the second bearing structure 5 is not greater than that from the second portion S221*b* to the second bearing structure 5. That is, a thickness of the radiation assembly 2 on the portion of the first bearing structure 1 parallel to the second bearing structure 5 is greater than that of the rest portion. It should be noted that the second sub-surface S221 may alternatively be a flat surface, that is, the thickness of the portion of the first bearing structure 1 parallel to the second bearing structure 5 is uniform, as long as the thickness satisfies the coupling distance between the feed structure and the radiation assembly 2.

In some examples, with continued reference to FIGS. 1 and 2, the first bearing structure 1 in the embodiment of the present disclosure includes not only the bearing substrate 11 and the bearing boss 12, but also a first side plate 13 and a second side plate 14, and a first isolation layer 31 disposed on the first side plate 13, and a second isolation layer (not shown) disposed on the second side plate 14. For example: the bearing substrate 11 includes a first side surface and a second side surface extending along a first direction X and opposite to each other in a second direction Y, the first side plate 13 is connected to the first side surface, the second side plate 14 is connected to the second side surface, and both the first side plate 13 and the second side plate 14 protrude from the fifth surface S12 and the sixth surface S22 of the bearing substrate 11, that is, a height of each of the first side plate 13 and the second side plate 14 in a direction perpendicular to the fifth surface S12 (the sixth surface S22) of the bearing substrate 11 is greater than a thickness of the bearing substrate 11. The first isolation layer 31 is fixed to a side of the first side plate 13 away from the first side surface of the bearing substrate 11, and the second isolation layer is fixed to a side of the second side plate 14 away from the second side surface of the bearing substrate 11. The first isolation layer is fixed to the first side plate 13, and the second isolation layer is fixed to the second side plate 14, forming a two-sided isolation wall. With such the arrangement, when the transparent oscillator unit is applied to a transparent antenna, the radiation assemblies 2 located in different sub-arrays 100 of the transparent antenna are mutually coupled. It should be noted that each sub-array 100 includes a plurality of transparent oscillator units arranged along the first direction X, and isolation walls of the plurality of transparent oscillator units have a one-piece structure. If the sub-arrays 100 in the transparent antenna are arranged side by side along the second direction Y, the isolation walls can reduce the risk of mutual coupling of the radiation assemblies 2 of the transparent oscillator units adjacently arranged in the second direction Y.

Further, in the embodiment of the present disclosure, a second opening 30 is formed in at least one of the first isolation layer 31 and the second isolation layer. In the embodiment of the present disclosure, both of the first isolation layer 31 and the second isolation layer are provided with the second openings 30. The second openings 30 are provided in the first isolation layer 31 and the second isolation layer, to improve a cross-polarization ratio and a signal analysis capability of the transparent oscillator unit.

In some examples, the second opening 30 in the first isolation layer 31 may be disposed in a middle region of the second isolation layer. Similarly, the second opening 30 in the second isolation layer may be disposed in a middle region of the second isolation layer. For example: an extending direction of a connecting line between a center of the first isolation layer 31 and a center of the second opening 30 is perpendicular to the first direction X; similarly, an extending direction of a connecting line between a center of the second isolation layer and a center of the second opening 30 is perpendicular to the first direction X. In some examples, the second opening 30 in the first isolation layer passes through the first isolation layer 31 and extends along the first direction X and away from a side of the bearing substrate 11; similarly, the second opening 30 in the second isolation layer passes through the second isolation layer and extends along the first direction X and away from the side of the bearing substrate 11. In some examples, a length of the second opening 30 in the first isolation layer 31 in the first direction X is a half wavelength; similarly, a length of the second opening 30 in the second isolation layer in the first direction X is a half wavelength. In the embodiment of the present disclosure, the length of the second opening 30 is set to be the half wavelength, to improve the cross-polarization ratio of the transparent oscillator unit.

Figure 6:
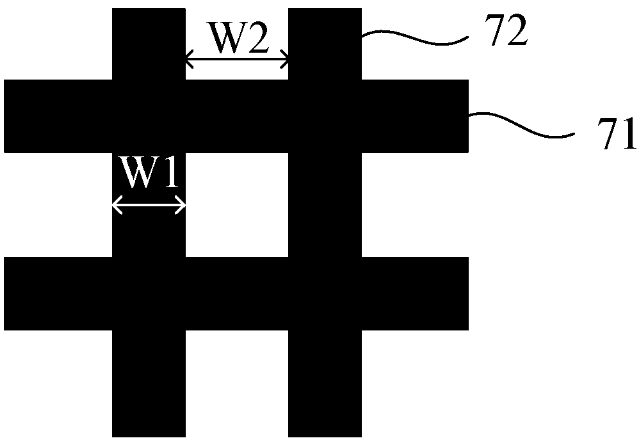
FIG. 6 is an enlarged view of a position A in FIG. 1.
Figure 16:
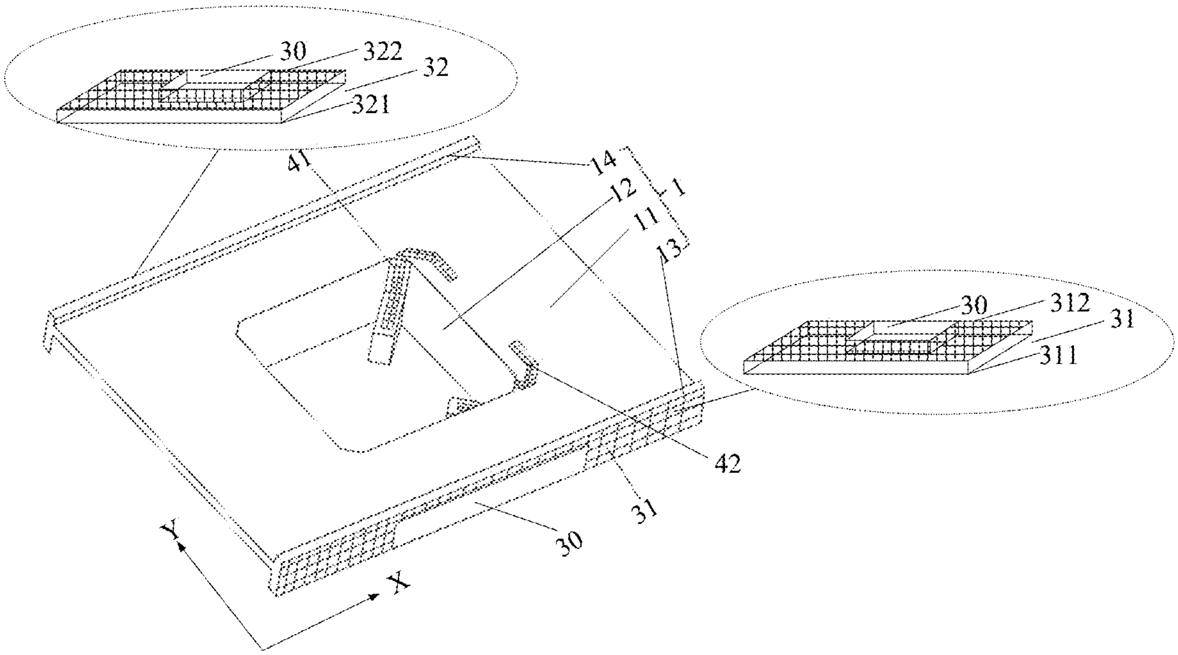
FIG. 16 shows a back perspective view of a transparent oscillator unit according to an embodiment of the present disclosure.

Further, in the embodiment of the present disclosure, as shown in FIG. 16, the first isolation layer 31 may include a first substrate 311 and a first conductive layer 312 which are stacked. The first substrate 311 serves as a support layer for the first conductive layer 312. The first substrate 311 is a flexible substrate, and a material of the first substrate 311 includes, but is not limited to, polyethylene terephthalate (PET) or polyimide (PI). The first substrate 311 has a thickness in a range of about 50 μm to 250 μm. The first substrate 311 may be attached to the first side plate 13 by an adhesive layer. A material of the adhesive layer includes, but is not limited to, an optically clear adhesive (OCA). In some examples, the first conductive layer 312 may have a metal mesh structure, so that the light transmittance of the transparent oscillator unit may be ensured. For example: FIG. 6 is an enlarged view of a position A in FIG. 1. Referring to FIG. 6, the metal mesh structure may include a plurality of first metal lines 71 and a plurality of second metal lines 72 crossing with the plurality of first metal lines 71. The first metal lines 71 are arranged side by side along the first direction X and extend along the second direction Y; the second metal lines 72 are arranged side by side along the first direction X and extend along a third direction. The light transmittance of the metal mesh structure is in a range of about 70% to 88%. In the embodiment of the present disclosure, the extending directions of the first metal lines 71 and the second metal lines 72 of the metal mesh structure may be perpendicular to each other, thereby forming square or rectangular hollow portions. Alternatively, the extending directions of the first metal lines 71 and the second metal lines 72 of the metal mesh structure may be non-perpendicular to each other. For example: an angle between the extending directions of the first metal lines 71 and the second metal lines 72 is 45°, thereby forming diamond-shaped hollow portions. Line widths, line thicknesses and line spacing of the first metal lines 71 and the second metal lines 72 of the metal mesh structure are preferably the same, but may be different. For example: the first metal lines 71 and the second metal lines 72 both have the line widths W1 in a range of about 1 μm to 30 μm, and the line spacing W2 in a range of about 50 μm to 250 μm; the line thicknesses in a range of about 0.5 μm to 10 μm.

Accordingly, in the embodiment of the present disclosure, as shown in FIG. 16, the second isolation layer 32 may include a second substrate 321 and a second conductive layer 322 which are stacked, and the second substrate 321 serves as a support layer for the second conductive layer 322. The second substrate 321 may be attached to the second side plate 14 by an adhesive layer. The second substrate 321 may be made of the same material as the first substrate 311, and the second conductive layer 322 may be made of the same material and have a structure as the first conductive layer 312. Thus, the detailed description of the material and the structure of each of the second substrate 321 and the second conductive layer 322 is omitted here.

In some examples, the bearing substrate 11, the bearing boss 12, the first side plate 13 and the second side plate 14 of the first bearing structure 1 may have a one-piece structure, so that the first bearing structure 1 may be formed by injection molding, which is simple in process and low in cost. Alternatively, the bearing substrate 11, the bearing boss 12, the first side plate 13 and the second side plate 14 may be fixedly assembled together by means including, but not limited to, screwing.

In some examples, the first bearing structure 1 serves as a support component for the feed structure and the radiation assembly 2, and may be made of a transparent hard material, such as: plastics. Further, the specific material includes, but is not limited to, polycarbonate (PC), copolymers of cycloolefin (COP), or polymethyl methacrylate (PMMA), or the like.

In some examples, in the embodiments of the present disclosure, the feed structure may include a first feed structure 41 and a second feed structure 42. Portions of orthographic projections of the first feed structure 41 and the second feed structure 42 on the second bearing structure 5 overlapping with an orthographic projection of the radiation assembly 2 on the second bearing structure 5 are a first line segment and a second line segment, respectively; extending directions of the first line segment and the second line segment both pass through a center of the orthographic projection of the radiation assembly 2 on the second bearing structure 5, and intersect with each other, for example, perpendicular to each other. Since the feed structure in the embodiment of the present disclosure includes the first feed structure 41 and the second feed structure 42, the transparent oscillator unit may be a dual polarized antenna. In some examples, the first feed structure 41 and the second feed structure 42 in embodiments of the present disclosure include, but are not limited to, transmission lines. In the embodiment of the present disclosure, the feed structure including the first feed structure 41 and the second feed structure 42 is taken as an example for explanation.

In some examples, referring to FIG. 3, in the embodiment of the present disclosure, each of the first feed structure 41 and the second feed structure 42 may alternatively adopt the metal mesh structure 401 which may also be formed on the flexible substrate 402 and fixedly attached to the first bearing structure 1 by the adhesive layer 403.

In some examples, when the fifth surface S12 of the bearing boss 12 includes the first sub-surface S121 and the first connection side surface S122, the orthographic projection of the radiation assembly 2 on the second bearing structure 5 is located within an orthographic projection of the second sub-surface S221 on the second bearing structure 5, and an orthographic projection of a center of the radiation assembly 2 on the second bearing structure coincides with an orthographic projection of a center of the second sub-surface S221 on the second bearing structure 5. For example: an outer contour of the first sub-surface S121 has the same shape as that of the radiation assembly 2. For example: the outer contour of the radiation assembly 2 is circular or polygonal, and correspondingly, the outer contour of the first sub-surface S121 is circular or polygonal. In some examples, the shape of the radiation assembly 2 in embodiments of the present disclosure may be a central-symmetric pattern, for example: a square, a circle or the like. The radiation assembly 2 satisfies at least one of the following conditions: the radiation assembly 2 includes a central hole; a notch located on a side of the radiation assembly 2 and concaved towards the center of the radiation assembly 2; each corner of the radiation assembly 2 is a flat chamfer; each corner of the radiation assembly 2 includes a convex structure. By changing the pattern design for the radiation assembly 2, a current path is lengthened, which is equivalent to increasing a physical size of the antenna, so that a resonant frequency of the antenna is reduced, and the antenna miniaturization is realized. The following description is made with reference to specific examples.

Figure 7:
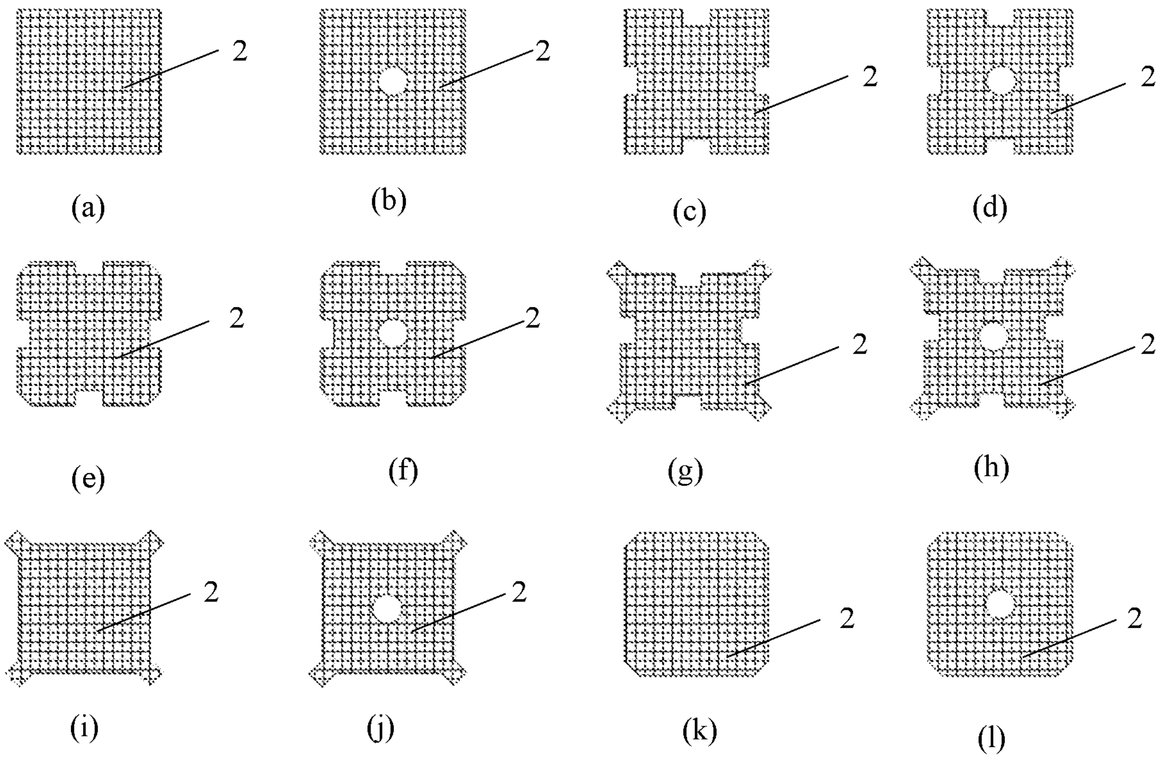
FIG. 7 is a schematic diagram of a radiation assembly of a transparent oscillator unit according to an embodiment of the present disclosure.

In a first example, as shown in a part (a) of FIG. 7, a contour of the radiation assembly 2 is a square, and the radiation structure is a complete square planar structure.

In a second example, as shown in a part (b) of FIG. 7, the contour of the radiation assembly 2 is a square, and includes a central hole at the center of the radiation assembly, and a shape of the central hole may be a circle, and a center of the central hole coincides with the center of the radiation assembly 2.

In a third example, as shown in a part (c) of FIG. 7, the radiation assembly 2 includes four sides having the same side length, and includes a notch formed on any side concaved toward the center of the radiation assembly.

In a fourth example, as shown in a part (d) of FIG. 7, compared to the radiation assembly 2 in the third example, the radiation assembly 2 includes a central hole at the center of the radiation assembly, the shape of the central hole may be circular, and the center of the central hole coincides with the center of the radiation assembly 2.

In a fifth example, as shown in a part (e) of FIG. 7, four corners of the radiation assembly 2 are flat chamfers, compared to the radiation assembly 2 in the third example. At this time, the radiation assembly 2 is equivalent to the radiation assembly 2 formed by cutting off the four corners in the second example to form the flat chamfers. The flat chamfers are formed, to realize impedance matching so as to reduce a loss. When the radiation assembly 2 adopts such a structure, the orthographic projections of the first feed structure 41 and the second feed structure 42 on the second bearing structure 5 intersect with orthographic projections of two adjacent flat chamfers in a circumferential direction of the radiation assembly on the second bearing structure 5, respectively, so that the transmission loss of the microwave signal can be reduced.

In a sixth example, as shown in a part (f) of FIG. 7, compared to the radiation assembly 2 in the fifth example, the radiation assembly 2 includes a central hole at the center of the radiation assembly, the shape of the central hole may be circular, and the center of the central hole coincides with the center of the radiation assembly 2.

In a seventh example, as shown in a part (g) of FIG. 7, compared to the radiation assembly 2 in the fifth example, protrusions (convex structures) are formed on four flat chamfers of the radiation assembly 2. The protrusions include, but are not limited to, squares.

In an eighth example, as shown in a part (h) of FIG. 7, compared to the radiation assembly 2 in the seventh example, the radiation assembly 2 includes a central hole at the center of the radiation assembly, the shape of the central hole may be circular, and the center of the central hole coincides with the center of the radiation assembly 2.

In a ninth example, as shown in a part (i) of FIG. 7, the shape of the radiation assembly is a polygonal with four flat chamfers. The polygon is equivalent to a polygon formed by cutting off four right angles of a square to form flat chamfers. The flat chamfers are formed to realize impedance matching so as to reduce a loss.

In a tenth example, as shown in a part (j) of FIG. 7, compared to the radiation assembly 2 in the ninth example, the radiation assembly 2 includes a central hole at the center of the radiation assembly, the shape of the central hole may be circular, and the center of the central hole coincides with the center of the radiation assembly 2.

In an eleventh example, as shown in a part (k) of FIG. 7, compared to the radiation assembly 2 in the ninth example, convex structures (protrusions) are formed on four flat chamfers of the radiation assembly 2. The convex structures include, but are not limited to, squares.

In a twelfth example, as shown in a part (1) of FIG. 7, compared to the radiation assembly 2 in the eleventh example, the radiation assembly 2 includes a central hole at the center of the radiation assembly, the shape of the central hole may be circular, and the center of the central hole coincides with the center of the radiation assembly 2.

No matter which of the above structures is adopted for the radiation assembly 2 in the embodiments of the present disclosure, the radiation assembly 2 may include a third substrate 102 and a third conductive layer 101 which are stacked; the third substrate 102 is fixed to the first surface S1 of the first bearing structure 1. For example: the third substrate 102 is attached to the first bearing structure 1 by an adhesive layer 103. The third substrate 102 may be a flexible substrate, and a material of the flexible substrate includes, but is not limited to, polyethylene terephthalate or polyimide. The third substrate has a thickness in a range of about 50 μm to 250 μm. A material of the adhesive layer includes, but is not limited to, an optically clear adhesive. In some examples, the third conductive layer 101 may have a metal mesh structure, so that the light transmittance of the transparent oscillator unit may be ensured. For example: the metal mesh structure may include a plurality of first metal lines 71 and a plurality of second metal lines 72 crossing with the plurality of first metal lines 71. The first metal lines 71 are arranged side by side along the first direction X and extend along the second direction Y; the second metal lines 72 are arranged side by side along the first direction X and extend along a third direction. The light transmittance of the metal mesh structure is in a range of about 70% to 88%. In the embodiment of the present disclosure, the extending directions of the first metal lines 71 and the second metal lines 72 of the metal mesh structure may be perpendicular to each other, thereby forming square or rectangular hollow portions. Alternatively, the extending directions of the first metal lines 71 and the second metal lines 72 of the metal mesh structure may be non-perpendicular to each other. For example: an angle between the extending directions of the first metal lines 71 and the second metal lines 72 is 45°, thereby forming diamond-shaped hollow portions. Line widths, line thicknesses and line spacing of the first metal lines 71 and the second metal lines 72 of the metal mesh structure are preferably the same, but may be different. For example: the first metal lines 71 and the second metal lines 72 both have the line widths W1 in a range of about 1 μm to 30 μm, and the line spacing W2 in a range of about 50 μm to 250 μm; the line thicknesses in a range of about 0.5 μm to 10 μm.

In some examples, the second bearing structure 5 may be made of the same material as the first bearing structure 1, that is, may be made of a transparent hard material, such as: plastics. Further, the specific material includes, but is not limited to, polycarbonate (PC), copolymers of cycloolefin (COP), or polymethyl methacrylate (PMMA), or the like. The second bearing structure 5 and the first bearing structure 1 may be fixed together by means including, but not limited to, screwing.

In some examples, the reference electrode layer 6 includes, but is not limited to, a ground electrode layer, and may be attached to a side of the second bearing structure 5 away from the first bearing structure 1. The reference electrode layer 6 may include a fourth substrate and a fourth conductive layer which are stacked. The fourth substrate may be attached to the second bearing structure 5 by an adhesive layer. The fourth substrate may be made of the same material as the third substrate 102, and the fourth conductive layer may be made of the same material and have a structure as the third conductive layer 101.

In some examples, when the fourth conductive layer of the reference electrode layer 6 and the third conductive layer 101 of the radiation assembly 2 both adopt a metal mesh structure, orthographic projections of hollow portions of the metal mesh structures corresponding to each other on the second bearing structure 5 overlap with each other, so that the light transmittance of the transparent oscillator unit can be effectively improved.

In some examples, the material of any one of the metal mesh structures includes, but is not limited to, a metal material such as copper, silver, aluminum, or the like, which is not limited in the embodiments of the present disclosure.

In order to make structures and technical effects of the transparent oscillator unit more clear in the embodiments of the present disclosure, specific structures of the transparent oscillator units will be given below.

Referring to FIGS. 1 to 6, a size of the transparent oscillator unit is about 55 mm×43 mm (0.64 λc×0.5 λc, λc is a wavelength at a central frequency). The transparent oscillator unit includes: a first bearing structure 1, a second bearing structure 5, a radiation assembly 2, a first feed structure 41, a second feed structure 42 and a reference electrode layer 6. The first bearing structure 1 includes a bearing substrate 11, a bearing boss 12, a first side plate 13, a second side plate 14, a first isolation layer and a second isolation layer. The bearing substrate 11 includes a third surface S11 and a fourth surface S21 opposite to each other; the bearing boss 12 includes fifth and sixth surfaces S12 and S22 opposite to each other. The third surface S11 of the bearing substrate 11 and the fifth surface S12 of the bearing boss 12 are connected to form the first surface S1 of the first bearing structure 1, and the fourth surface S21 of the bearing substrate 11 and the sixth surface S22 of the bearing boss 12 are connected to form the second surface S2 of the first bearing structure 1. The radiation assembly 2 is arranged on the fifth surface S12 of the bearing boss 12 and the feed structure is arranged on the fourth surface S21 and the sixth surface S22. The bearing substrate 11 includes a first opening corresponding to a concave part. The radiation assembly 2 is arranged on the first sub-surface S121; the feed structure extends from the fourth surface S21 to the second sub-surface S221 through the second connection side surface S222. The first isolation layer and the second isolation layer are both provided with second openings. The first isolation layer may include a first substrate and a first conductive layer which are stacked. The second isolation layer may include a second substrate and a second conductive layer which are stacked. The radiation assembly 2 includes a third substrate 102 and a third conductive layer 101 which are stacked together. The reference electrode layer 6 includes a fourth substrate and a fourth conductive layer which are stacked. The first substrate, the second substrate, the third substrate 102 and the fourth substrate may all be made of the same material as described above. The first conductive layer, the second conductive layer, the third conductive layer 101, and the fourth conductive layer may be made of the same material and have the same structure, and therefore, description thereof will not be repeated.

Figure 8:
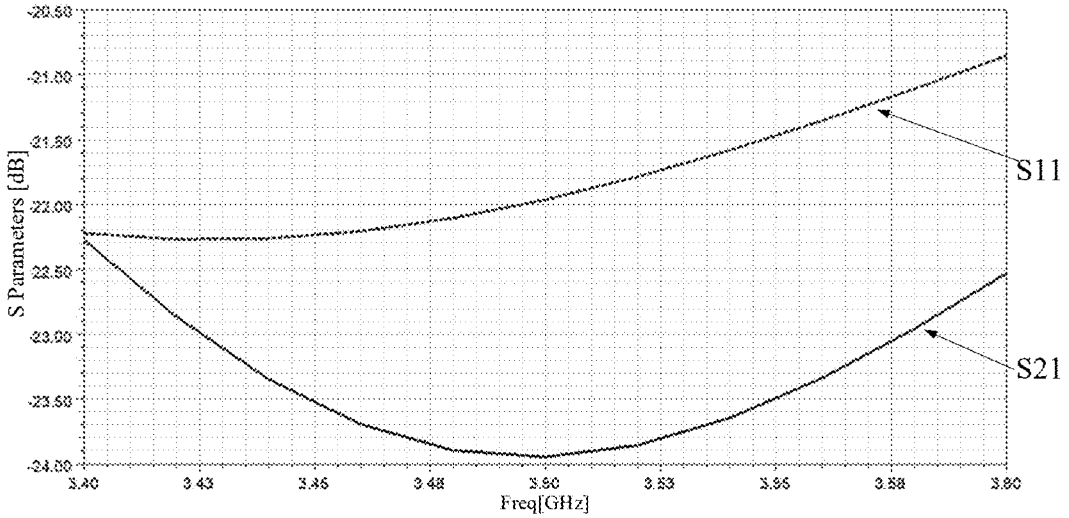
FIG. 8 is a schematic diagram of performance parameters S11 and S21 of a transparent oscillator unit according to an embodiment of the present disclosure.
Figure 9:
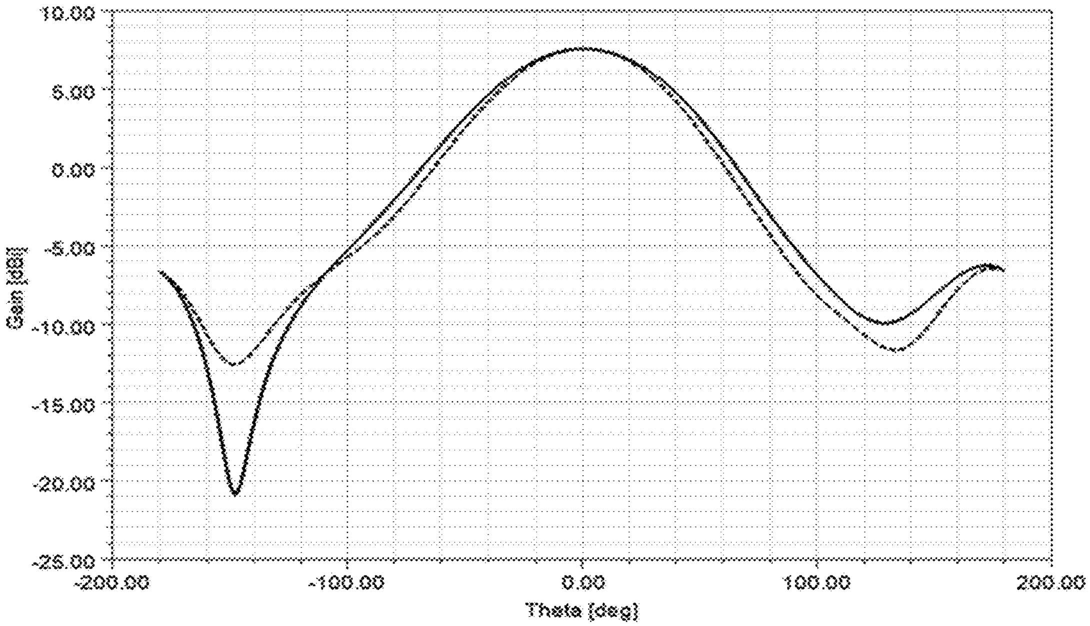
FIG. 9 shows radiation patterns of a horizontal plane and a vertical plane of a transparent oscillator unit at a center frequency according to an embodiment of the present disclosure.

The inventors conducted simulation experiments for the above transparent oscillator unit. FIG. 8 is a schematic diagram of performance parameters S11 and S21 of a transparent oscillator unit according to an embodiment of the present disclosure. As shown in FIG. 8, for the transparent oscillator unit, S11 is less than −22 dB and S21 (that is, isolation) is greater than 20 dB within a frequency in a range of 3400 MHz to 3600 MHz. FIG. 9 shows radiation patterns of a horizontal plane and a vertical plane of a transparent oscillator unit at a center frequency according to an embodiment of the present disclosure. As shown in FIG. 9, the transparent oscillator unit can achieve a gain of 7.5 dBi at the center frequency. 3 dB beam width of the horizontal plane may be 820 and 3 dB beam width of the vertical plane may be 75°.

Figure 10:
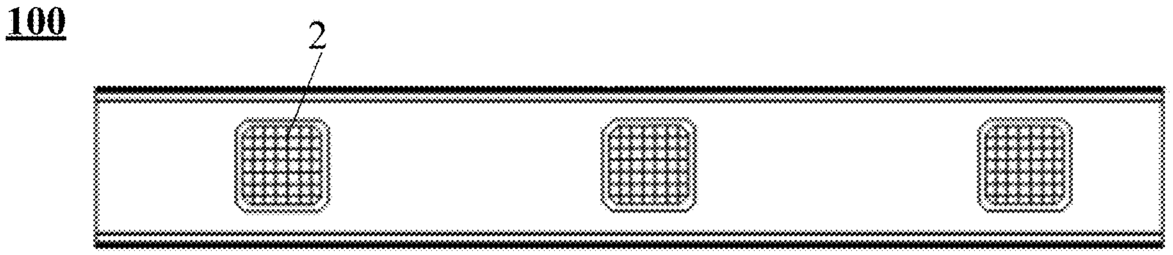
FIG. 10 is a top view of a sub-array in a transparent antenna according to an embodiment of the present disclosure.
Figure 11:
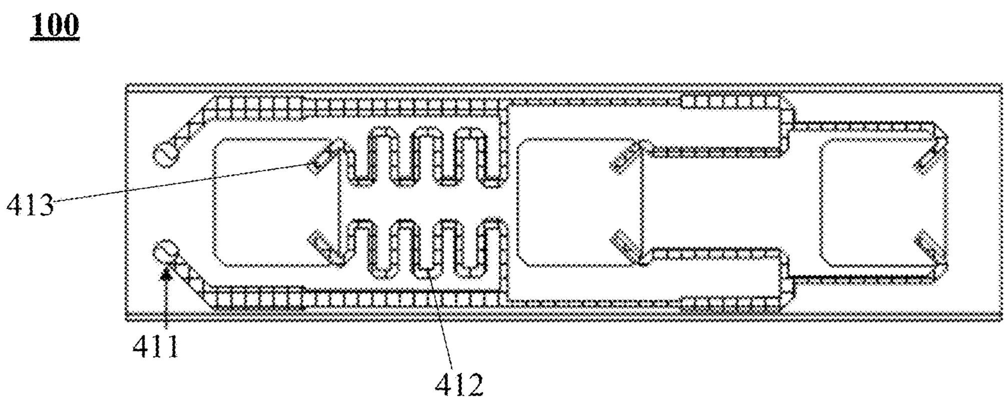
FIG. 11 is a bottom view of one sub-array in a transparent antenna according to an embodiment of the present disclosure.
Figure 12:
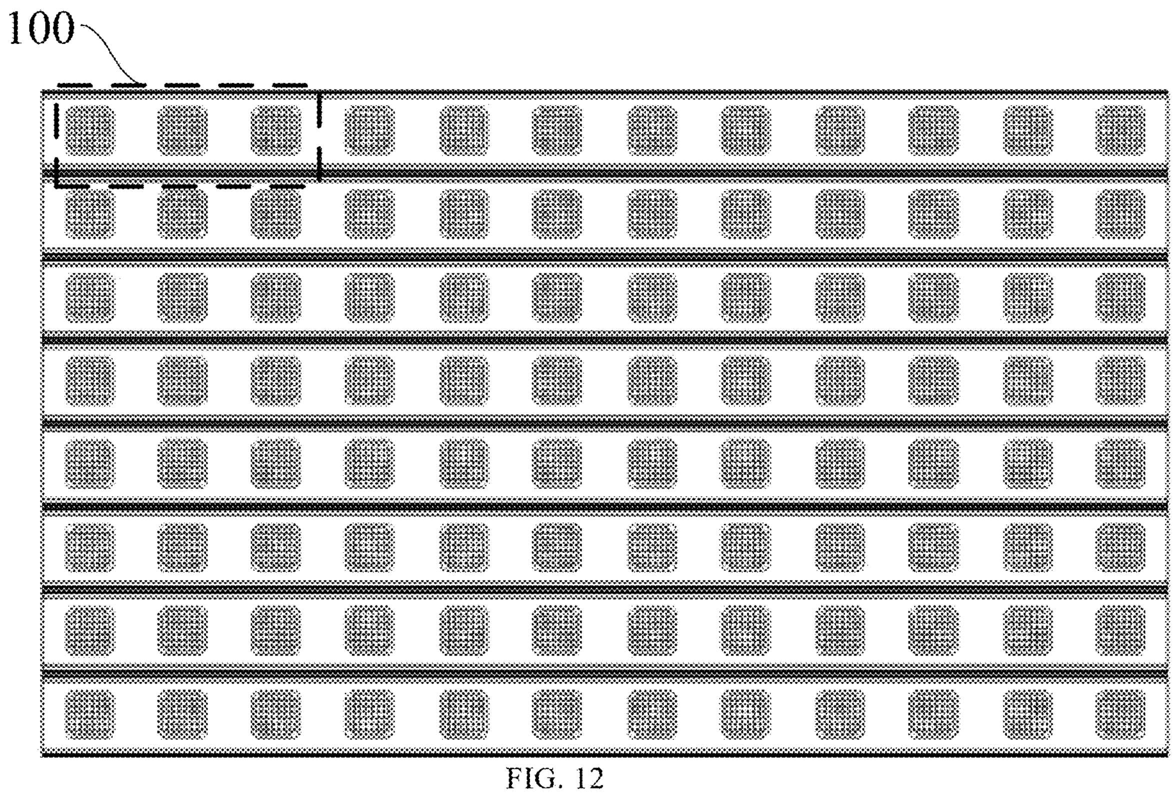
FIG. 12 is a top view of a transparent antenna according to an embodiment of the present disclosure.
Figure 13:
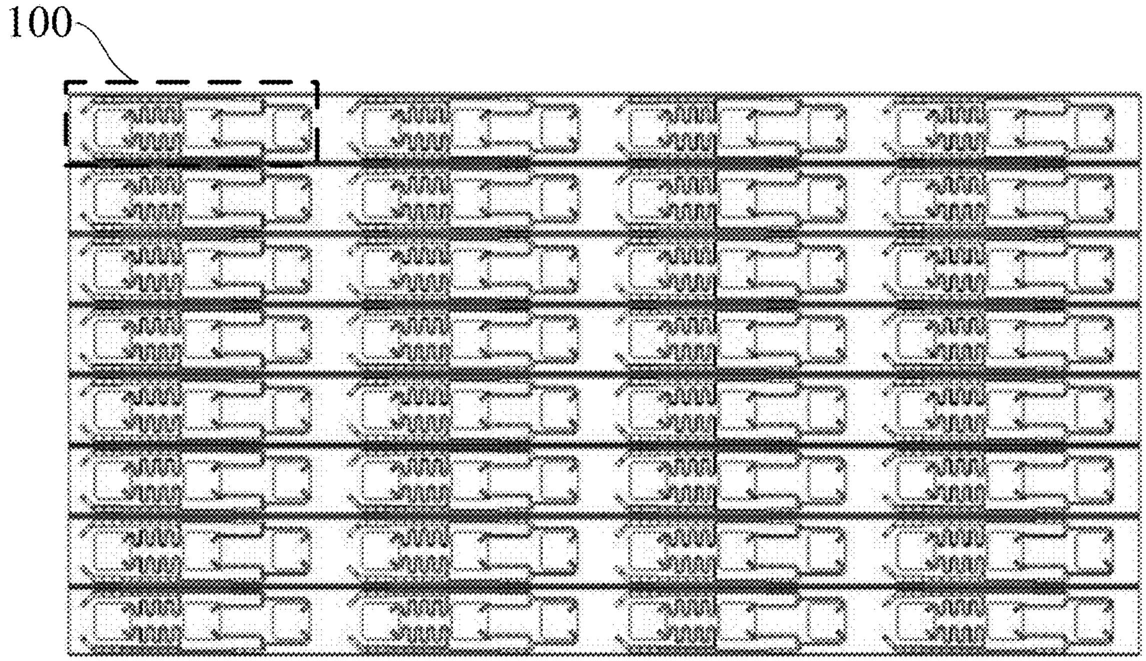
FIG. 13 is a bottom view of a transparent antenna according to an embodiment of the present disclosure.

In a second aspect, FIG. 10 is a top view of a sub-array 100 in a transparent antenna according to an embodiment of the present disclosure. FIG. 11 is a bottom view of one sub-array 100 in a transparent antenna according to an embodiment of the present disclosure. FIG. 12 is a top view of a transparent antenna according to an embodiment of the present disclosure. FIG. 13 is a bottom view of a transparent antenna according to an embodiment of the present disclosure. The embodiment of the present disclosure provides a transparent antenna, and a transparent oscillator unit in the transparent antenna is the transparent oscillator unit in the above embodiments. Specifically, the transparent antenna includes a plurality of sub-arrays 100, each sub-array 100 includes a plurality of transparent oscillator units arranged side by side along the first direction X, and the feed structure is shared among the transparent oscillator units in any sub-array 100.

For example: the feed structure includes a first feed port 411, a plurality of second feed ports 413 and a plurality of transmission lines 412, wherein the plurality of second feed ports 413 are in one-to-one correspondence with the radiation assemblies 2 of the transparent oscillator units in the sub-array 100; one transmission line 412 is connected between the first feed port 411 and one corresponding second feed port 413; line lengths of the transmission lines 412 connected to the second feed ports 413 corresponding to the radiation assemblies 2 of the transparent oscillator units in the sub-array 100 monotonically increases or decreases along the first direction X. In FIGS. 10 and 11, each sub-array 100 includes three transparent oscillator units as an example, and the line lengths of three transmission lines 412 respectively corresponding to the three transparent oscillator units decrease sequentially from left to right along the first direction X. With such the arrangement, it ensures that the three transparent oscillator units in each sub-array 100 have consistent time delay and uniform radiation.

Figure 14:
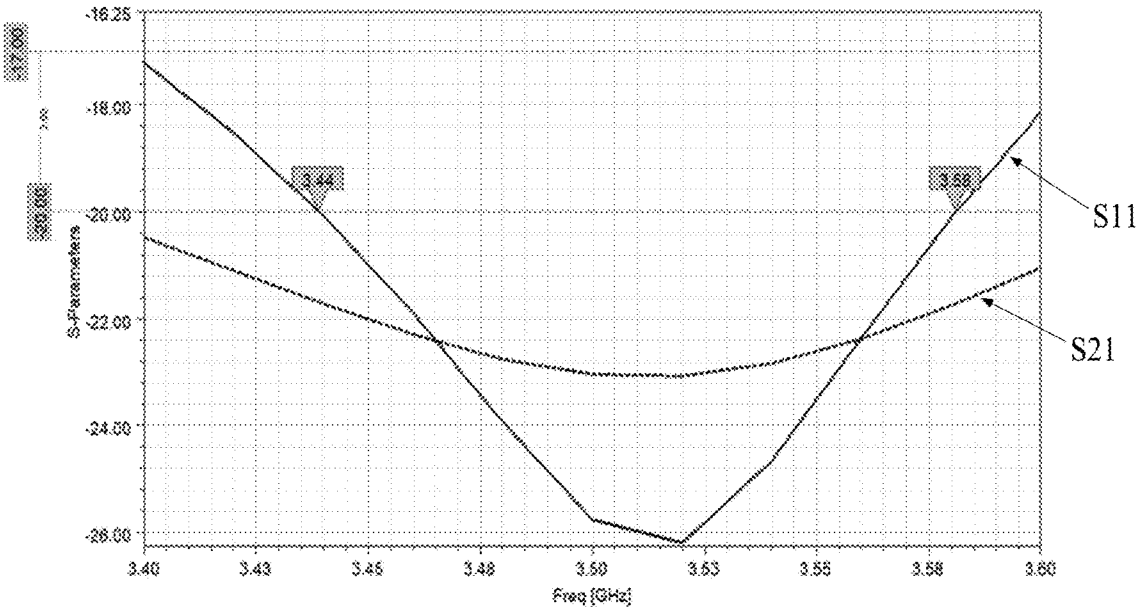
FIG. 14 is a schematic diagram of performance parameters S11 and S21 of a sub-array of a transparent antenna according to an embodiment of the present disclosure.

As shown in FIGS. 10 and 11, a 1×3 sub-array 100 in the antenna unit has a size of 165 mm×43 mm×12 mm (1.92

λc×0.5 λc×0.13 λc). FIG. 14 is a schematic diagram of performance parameters S1 and S21 of a sub-array 100 of a transparent antenna according to an embodiment of the present disclosure. As shown in FIG. 14, for the 1×3 sub-array 100 of the transparent antenna in the embodiment of the present disclosure, SIT is greater than 17 dB and the isolation is greater than 20 dB within an operating frequency in a range from 3400 MHz to 3600 MHz.

Figure 15:
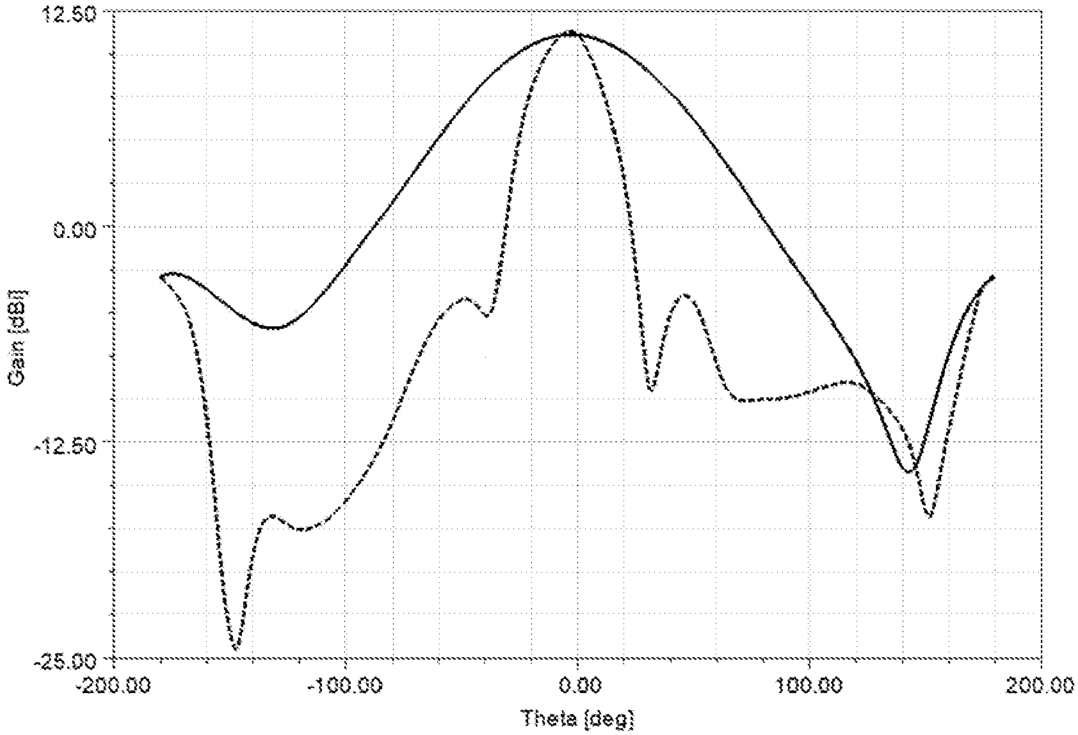
FIG. 15 shows radiation patterns of a horizontal plane and a vertical plane of a sub-array of a transparent antenna at a center frequency according to an embodiment of the present disclosure.

FIG. 15 shows radiation patterns of a horizontal plane and a vertical plane of a sub-array 100 of a transparent antenna at a center frequency according to an embodiment of the present disclosure. As shown in FIG. 15, the 1×3 sub-array 100 of the antenna according to an embodiment of the present disclosure has an antenna gain of 11 dBi or more. The 3 dB beam width of the horizontal plane is 790 and the 3 dB beam width of the vertical plane is 28°. Meanwhile, a wave beam of the whole vertical plane has the electrical downtilt characteristics of 3°, and a difference between gains of an upper sidelobe and a main lobe is ensured to be more than 15 dB.

FIGS. 12 and 13 are full structural diagrams of a transparent antenna in the embodiment of the present disclosure; the transparent antenna includes 96 transparent oscillator units or 32 groups of 1×3 sub-arrays 100. A size of the transparent antenna in the embodiment of the present disclosure is 660 mm×351 mm×12 mm (7.7 λc×4.1 λc×0.13 λc). The transparent antenna in the embodiment of the present disclosure is simple and cheap to process and has a good hiding characteristic.

In a third aspect, an embodiment of the present disclosure provides an antenna system, which may include the transparent antenna described above. The antenna system provided by the embodiment of the present disclosure further includes a transceiver unit, a radio frequency transceiver, a signal amplifier, a power amplifier, and a filtering unit. The transparent antenna in the antenna system may be used as a transmitting antenna or a receiving antenna. The transceiver unit may include a baseband and a receiving terminal, where the baseband provides a signal in at least one frequency band, such as 2G signal, 3G signal, 4G signal, 5G signal, or the like; and transmits the signal in the at least one frequency band to the radio frequency transceiver. After the signal is received by the transparent antenna in the antenna system and is processed by the filtering unit, the power amplifier, the signal amplifier, and the radio frequency transceiver, the transparent antenna may transmit the signal to the receiving terminal (such as an intelligent gateway or the like) in the transceiver unit.

Further, the radio frequency transceiver is connected to the transceiver unit and is configured to modulate the signals transmitted by the transceiver unit or demodulate the signals received by the transparent antenna and then transmit the signals to the transceiver unit. Specifically, the radio frequency transceiver may include a transmitting circuit, a receiving circuit, a modulating circuit, and a demodulating circuit. After the transmitting circuit receives multiple types of signals provided by the baseband, the modulating circuit may modulate the multiple types of signals provided by the baseband, and then transmit the modulated signals to the antenna. The signals received by the transparent antenna are transmitted to the receiving circuit of the radio frequency transceiver, and transmitted by the receiving circuit to the demodulating circuit, and demodulated by the demodulating circuit and then transmitted to the receiving terminal.

Further, the radio frequency transceiver is connected to the signal amplifier and the power amplifier, which are in turn connected to the filtering unit connected to at least one transparent antenna. In the process of transmitting signals by the antenna system, the signal amplifier is used for improving a signal-to-noise ratio of the signals output by the radio frequency transceiver and then transmitting the signals to the filtering unit; the power amplifier is used for amplifying the power of the signals output by the radio frequency transceiver and then transmitting the signals to the filtering unit; the filtering unit specifically includes a duplexer and a filtering circuit, the filtering unit combines signals output by the signal amplifier and the power amplifier and filters noise waves and then transmits the signals to the transparent antenna, and the transparent antenna radiates the signals. In the process of receiving signals by the antenna system, the signals received by the transparent antenna are transmitted to the filtering unit, which filters noise waves in the signals received by the antenna and then transmits the signals to the signal amplifier and the power amplifier, and the signal amplifier gains the signals received by the antenna to increase the signal-to-noise ratio of the signals; the power amplifier amplifies the power of the signals received by the transparent antenna. The signals received by the transparent antenna are processed by the power amplifier and the signal amplifier and then transmitted to the radio frequency transceiver, and the radio frequency transceiver transmits the signals to the transceiver unit.

In some examples, the signal amplifier may include various types of signal amplifiers, such as a low noise amplifier, without limitation.

In some examples, the antenna system provided by the embodiments of the present disclosure further includes a power management unit connected to the power amplifier and for providing the power amplifier with a voltage for amplifying the signal.

It should be understood that the above embodiments are merely exemplary embodiments adopted to explain the principles of the present disclosure, and the present disclosure is not limited thereto. It will be apparent to one of ordinary skill in the art that various changes and modifications may be made therein without departing from the spirit and scope of the present disclosure, and such changes and modifications also fall within the scope of the present disclosure.

What is claimed is:

1. A transparent oscillator unit, comprising:

a first bearing structure comprising a first surface and a second surface opposite to each other;

a radiation assembly on the first surface of the first bearing structure;

at least one feed structure on the second surface of the first bearing structure;

a second bearing structure on a side of the at least one feed structure away from the radiation assembly, and fixed to the first bearing structure; and a reference electrode layer on a side of the second bearing structure away from the first bearing structure;

wherein orthographic projections of any two of the radiation assembly, the at least one feed structure and the reference electrode layer on the second bearing structure at least partially overlap with each other;

wherein the first bearing structure comprises:

a bearing substrate comprising a third surface and a fourth surface opposite to each other; and a bearing boss on the bearing substrate and on the third surface of the bearing substrate; wherein the bearing boss comprises a fifth surface and a sixth surface opposite to each other, and the fifth surface and the third surface are connected together to form the first surface; the sixth surface and the fourth surface are connected together to form the second surface; and the radiation assembly is on the fifth surface, and the at least one feed structure is on the fourth surface and the sixth surface;

wherein the first bearing structure further comprises: a first side plate and a second side plate, and the bearing substrate comprises a first side surface and a second side surface extending along a first direction and opposite to each other in a second direction, the first side plate is connected to the first side surface, the second side plate is connected to the second side surface, and both the first side plate and the second side plate protrude from the third surface and the fourth surface; and the transparent oscillator unit further comprises a first isolation layer on a surface of the first side plate away from the first side surface, and a second isolation layer on a surface of the second side plate away from the second side surface;

wherein the first isolation layer comprises a first substrate and a first conductive layer which are stacked together; the first substrate is fixed to the first side plate; and the second isolation layer comprises a second substrate and a second conductive layer which are stacked together; the second substrate is fixed to the second side plate; and wherein each of the first conductive layer and the second conductive layer comprises a metal-mesh structure.

2. The transparent oscillator unit of claim 1, wherein the bearing boss comprises a concave part, and the bearing substrate comprises a first opening corresponding to the concave part;

the fifth surface comprises a first sub-surface, and a first connection side surface connecting the third surface and the first sub-surface; the sixth surface comprises a second sub-surface, and a second connection side surface connecting the fourth surface and the second sub-surface; and the radiation assembly is on the first sub-surface; the at least one feed structure extends from the fourth surface to the second sub-surface by passing through the second connection side surface.

3. The transparent oscillator unit of claim 2, wherein the second sub-surface comprises a first portion and a second portion; a part of the at least one feed structure is on the first portion, and a distance between the first portion and the second bearing structure is no greater than a distance between the second portion and the second bearing structure.

4. The transparent oscillator unit of claim 1, wherein at least one of the first isolation layer and the second isolation layer comprises a second opening.

5. The transparent oscillator unit of claim 4, wherein a length of the second opening in the first direction is a half wavelength.

6. The transparent oscillator unit of claim 1, wherein the first side plate, the second side plate, the bearing substrate and the bearing boss have a one-piece structure.

7. The transparent oscillator unit of claim 1, wherein the at least one feed structure comprises a first feed structure and a second feed structure;

portions of orthographic projections of the first feed structure and the second feed structure on the second bearing structure overlapping with an orthographic projection of the radiation assembly on the second bearing structure comprise a first line segment and a second line segment, respectively; extending directions of the first line segment and the second line segment both pass through a center of the orthographic projection of the radiation assembly on the second bearing structure, and intersect with each other.

8. The transparent oscillator unit of claim 1, wherein a shape of the radiation assembly is a central-symmetric pattern.

9. The transparent oscillator unit of claim 8, wherein the radiation assembly satisfies at least one of the following conditions:

the radiation assembly comprises a central hole;

the radiation assembly comprises a notch on a side of the radiation assembly and concaved towards a center of the radiation assembly;

each corner of the radiation assembly is a flat chamfer; and each corner of the radiation assembly comprises a protrusion thereon.

10. The transparent oscillator unit of claim 1, wherein the radiation assembly is adhered to the first surface of the first bearing structure by an adhesive layer.

11. The transparent oscillator unit of claim 1, wherein the radiation assembly comprises a third substrate and a third conductive layer which are stacked together; the third substrate is fixed to the first surface of the first bearing structure.

12. The transparent oscillator unit of claim 11, wherein the third conductive layer comprises a metal mesh structure.

13. The transparent oscillator unit of claim 12, wherein the metal mesh structure has a line width in a range from 2 μm to 30 μm; a line spacing in a range from 50um to 250um; and a line thickness in a range from 1 μm to 10 μm.

14. A transparent antenna, comprising a plurality of sub-arrays, wherein each sub-array comprises a plurality of transparent oscillator units, each of which is the transparent oscillator unit of claim 1, arranged side by side along a first direction, and the at least one feed structure is shared among the transparent oscillator units in each sub-array.

15. The transparent antenna of claim 14, wherein the feed structure comprises a first feed port, a plurality of second feed ports and a plurality of transmission lines, wherein the plurality of second feed ports are in one-to-one correspondence with the radiation assemblies of the transparent oscillator units in the sub-array; one transmission line of the plurality of transmission lines is connected between the first feed port and one corresponding second feed port; and lengths of the transmission lines connected to the second feed ports corresponding to the radiation assemblies of the transparent oscillator units in the sub-array monotonically increases or decreases along the first direction.

16. An antenna system, comprising the transparent antenna of claim 14.

* * * * *